US009467837B2

(12) United States Patent
Wang et al.

(10) Patent No.: US 9,467,837 B2
(45) Date of Patent: *Oct. 11, 2016

(54) METHOD AND APPARATUS FOR NON-VOICE EMERGENCY SERVICES

(71) Applicant: INTERDIGITAL PATENT HOLDINGS, INC., Wilmington, DE (US)

(72) Inventors: Peter S. Wang, E. Setauket, NY (US); Kai Liu, Dublin, OH (US); Pascal M. Adjakple, Great Neck, NY (US); Saad Ahmad, Montreal (CA); Ulises Olvera-Hernandez, Kirkland (CA); Virgil Comsa, Montreal (CA); Mahmoud Watfa, Saint Leonard (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/523,215

(22) Filed: Oct. 24, 2014

(65) Prior Publication Data

US 2015/0044985 A1     Feb. 12, 2015

Related U.S. Application Data

(63) Continuation of application No. 13/458,204, filed on Apr. 27, 2012, now Pat. No. 8,874,072.

(60) Provisional application No. 61/480,710, filed on Apr. 29, 2011, provisional application No. 61/556,030, filed on Nov. 4, 2011.

(51) Int. Cl.
*H04M 11/04*     (2006.01)
*H04W 4/00*     (2009.01)

(Continued)

(52) U.S. Cl.
CPC ............ *H04W 4/22* (2013.01); *H04L 12/1895* (2013.01); *H04M 3/5116* (2013.01); *H04M 7/1205* (2013.01); *H04W 4/005* (2013.01); *H04W 76/007* (2013.01); *H04M 3/42382* (2013.01)

(58) Field of Classification Search
None
See application file for complete search history.

(56) References Cited

U.S. PATENT DOCUMENTS 8,874,072 B2 * 10/2014 Wang .................. H04M 3/5116
455/404.1
2005/0287980 A1    12/2005 Wood
(Continued)

FOREIGN PATENT DOCUMENTS

WO     2005/112488     11/2005

OTHER PUBLICATIONS

National Emergency Number Association Next Generation Messaging Working Group, "Use Cases and Suggested Requirements for Non-Voice-Centric (NVC) Emergency Services," NENA-73-501, Version 1.0 (Jan. 11, 2011).
(Continued)

*Primary Examiner* — Erika Washington
(74) *Attorney, Agent, or Firm* — Volpe and Koenig, P.C.

(57) ABSTRACT

A method and apparatus for performing non-voice emergency services (NOVES) between a wireless transmit/receive unit (WTRU) and a public safety answering point (PSAP) is disclosed. A NOVES session may be initiated by sending a NOVES initiation request message that includes information relating to the NOVES capabilities of the WTRU, and information relating to an emergency situation. The information relating to the NOVES capabilities of the WTRU may include an indication of whether the WTRU supports a fake power-off mode, or whether the WTRU supports PSAP control. Other methods are disclosed that include a method for a PSAP combining a multiple NOVES sessions, and a method for handing over a NOVES session having multiple media streams.

20 Claims, 11 Drawing Sheets

(51) Int. Cl.
H04M 3/00 (2006.01)
H04W 4/22 (2009.01)
H04M 3/51 (2006.01)
H04M 7/12 (2006.01)
H04W 76/00 (2009.01)
H04L 12/18 (2006.01)
H04M 3/42 (2006.01)

(56) References Cited

U.S. PATENT DOCUMENTS

| | | |
|---|---|---|
| 2006/0141960 A1 | 6/2006 | Fernandez et al. |
| 2007/0259645 A1 | 11/2007 | Laliberte |
| 2009/0075630 A1* | 3/2009 | McLean ............... G02F 21/602 455/411 |
| 2011/0065456 A1* | 3/2011 | Brennan ............... H04W 48/04 455/456.4 |
| 2011/0189971 A1 | 8/2011 | Faccin et al. |
| 2012/0108196 A1 | 5/2012 | Musgrove et al. |

OTHER PUBLICATIONS

REACH112, "REACH112's position on NOVES—Non-Voice Emergency Services," (Feb. 3, 2011).

Third Generation Partnership Project, "Technical Specification Group Services and System Aspects; Study on Non-Voice Emergency Services (Release 11)," 3GPP TR 22.871 V11.1.0 (Mar. 2011).

Third Generation Partnership Project, "Technical Specification Group Services and System Aspects; Study on Non-Voice Emergency Services (Release 11)," 3GPP TR 22.871 V11.3.0 (Sep. 2011).

Third Generation Partnership Project, "Technical Specification Group Services and System Aspects; Study on Non-Voice Emergency Services (Release 11)," 3GPP TR 22.871 V11.0.1 (Feb. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.13.0 (Mar. 2011).

Third Generation Partnership Project, "Technical Specification Group Services and System Aspects; General Packet Radio Services (GPRS) enhancements for Evolved Universal Terrestrial Radio Access Network (E-UTRAN) access (Release 8)," 3GPP TS 23.401 V8.16.0 (Mar. 2012).

Third Generation Partnership Project, "Technical Specification Group Services and System Aspects; General Packet Radio Services (GPRS) enhancements for Evolved Universal Terrestrial Radio Access Network (E-UTRAN) access (Release 9)," 3GPP TS 23.401 V9.8.0 (Mar. 2011).

Third Generation Partnership Project, "Technical Specification Group Services and System Aspects; General Packet Radio Services (GPRS) enhancements for Evolved Universal Terrestrial Radio Access Network (E-UTRAN) access (Release 9)," 3GPP TS 23.401 V9.12.0 (Mar. 2012).

Third Generation Partnership Project, "Technical Specification Group Services and System Aspects; General Packet Radio Services (GPRS) enhancements for Evolved Universal Terrestrial Radio Access Network (E-UTRAN) access (Release 10)," 3GPP TS 23.401 V10.3.0 (Mar. 2011).

Third Generation Partnership Project, "Technical Specification Group Services and System Aspects; General Packet Radio Services (GPRS) enhancements for Evolved Universal Terrestrial Radio Access Network (E-UTRAN) access (Release 10)," 3GPP TS 23.401 V10.7.0 (Mar. 2012).

Third Generation Partnership Project, "Technical Specification Group Services and System Aspects; General Packet Radio Services (GPRS) enhancements for Evolved Universal Terrestrial Radio Access Network (E-UTRAN) access (Release 11)," 3GPP TS 23.401 V11.1.0 (Mar. 2012).

Third Generation Partnership Project, "Technical Specification Group Core Network and Terminals; Mobile radio interface signalling layer 3; General aspects (Release 7)," 3GPP TS 24.007 V7.0.0 (Sep. 2005).

Third Generation Partnership Project, "Technical Specification Group Core Network and Terminals; Mobile radio interface signalling layer 3; General aspects (Release 8)," 3GPP TS 24.007 V8.2.0 (Jun. 2009).

Third Generation Partnership Project, "Technical Specification Group Core Network and Terminals; Mobile radio interface signalling layer 3; General aspects (Release 9)," 3GPP TS 24.007 V9.0.0 (Dec. 2009).

Third Generation Partnership Project, "Technical Specification Group Core Network and Terminals; Mobile radio interface signalling layer 3; General aspects (Release 10)," 3GPP TS 24.007 V10.0.0 (Mar. 2011).

Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.9.0 (Mar. 2011).

Third Generation Partnership Project, "Technical Specification Group Core Network and Terminals; Non-Access-Stratum (NAS) protocol for Evolved Packet System (EPS); Stage 3(Rlease 8)," 3GPP TS 24.301 V8.10.0 (Jun. 2011).

Third Generation Partnership Project, "Technical Specification Group Core Network and Terminals; Non-Access-Stratum (NAS) protocol for Evolved Packet Systems (EPS); Stage 3 (Release 9)," 3GPP TS 24.301 V9.6.0 (Mar. 2011).

Third Generation Partnership Project, "Technical Specification Group Core Network and Terminals; Non-Access-Stratum (NAS) protocol for Evolved Packet Systems (EPS); Stage 3 (Release 9)," 3GPP TS 24.301 V9.9.0 (Mar. 2012).

Third Generation Partnership Project, "Technical Specification Group Core Network and Terminals; Non-Access-Stratum (NAS) protocol for Evolved Packet Systems (EPS); Stage 3 (Release 10)," 3GPP TS 24.301 V10.2.0 (Mar. 2011).

Third Generation Partnership Project, "Technical Specification Group Core Network and Terminals; Non-Access-Stratum (NAS) protocol for Evolved Packet Systems (EPS); Stage 3 (Release 10)," 3GPP TS 24.301 V10.6.1 (Mar. 2012).

Third Generation Partnership Project, "Technical Specification Group Core Network and Terminals; Non-Access-Stratum (NAS) protocol for Evolved Packet Systems (EPS); Stage 3 (Release 11)," 3GPP TS 24.301 V11.2.1 (Mar. 2012).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).

\* cited by examiner

ABSTRACT
METHOD AND APPARATUS FOR NON-VOICE EMERGENCY SERVICES

CROSS REFERENCE TO RELATED APPLICATIONS

This application is a continuation of U.S. patent application Ser. No. 13/458,204 filed Apr. 27, 2012, which will issue on Oct. 28, 2014 as U.S. Pat. No. 8,874,072, which claims the benefit of Application No. 61/480,710 filed on Apr. 29, 2011, and Application No. 61/556,030 filed on Nov. 4, 2011, the contents of which are hereby incorporated by reference a if fully set forth herein.

BACKGROUND

The Emergency Services community has a need to support multimedia and other forms of emergency services with the same general characteristics as emergency voice calls (such as, for example, 9-1-1 or 1-1-2) in a wireless network. However, Non-Voice Emergency Services (NOVES) are not currently fully supported.

NOVES may be an end-to-end session between a user and a Public Safety Answering Point (PSAP). For example, FIG. 1 shows a traffic model for establishment of a NOVES session including a human initiated device in communication with a PSAP. Examples of non-verbal communications for an emergency services network may include: (1) text messages from citizen to emergency services; (2) session based and/or session-less instant messaging type sessions with emergency services; (3) multi-media (for example, pictures and video clips) transfer to emergency services either during or after other communications with emergency services; (4) a real-time video session with emergency services; or (5) emergency communications to emergency services by individuals with special needs (for example, hearing impaired citizens).

Current proposals for NOVES only support initiation of NOVES from a manned user device to a PSAP. However, other scenarios are possible and additional procedures and infrastructure are needed.

SUMMARY

A method and apparatus for performing non-voice emergency services (NOVES) between a wireless transmit/receive unit (WTRU) and a public safety answering point (PSAP) is disclosed. A NOVES session may be initiated by sending a NOVES initiation request message that includes information relating to the NOVES capabilities of the WTRU, and information relating to an emergency situation. The information relating to the NOVES capabilities of the WTRU may include an indication of whether the WTRU supports a fake power-off mode, or whether the WTRU supports PSAP control. Additionally, the NOVES session initiation message may include a location type field that indicates which types of location information are available to the WTRU. The NOVES session initiation message may also include a device location with respect to emergency site field that indicates where the WTRU is with respect to an emergency situation.

A method for a PSAP to combine multiple NOVES sessions is also disclosed. A PSAP may establish a first NOVES session relating to an emergency situation with a first WTRU. Then the PSAP may establish a second NOVES session with a second WTRU relating to the emergency situation. Once both sessions are established, the PSAP may combine the first NOVES session and the second NOVES session into a single combined NOVES session. The combined NOVES session may make information received from the first WTRU available to the second WTRU. The first and second NOVES sessions may also be carried out using different media formats.

BRIEF DESCRIPTION OF THE DRAWINGS

A more detailed understanding may be had from the following description, given by way of example in conjunction with the accompanying drawings wherein.

DETAILED DESCRIPTION

Figure 1:
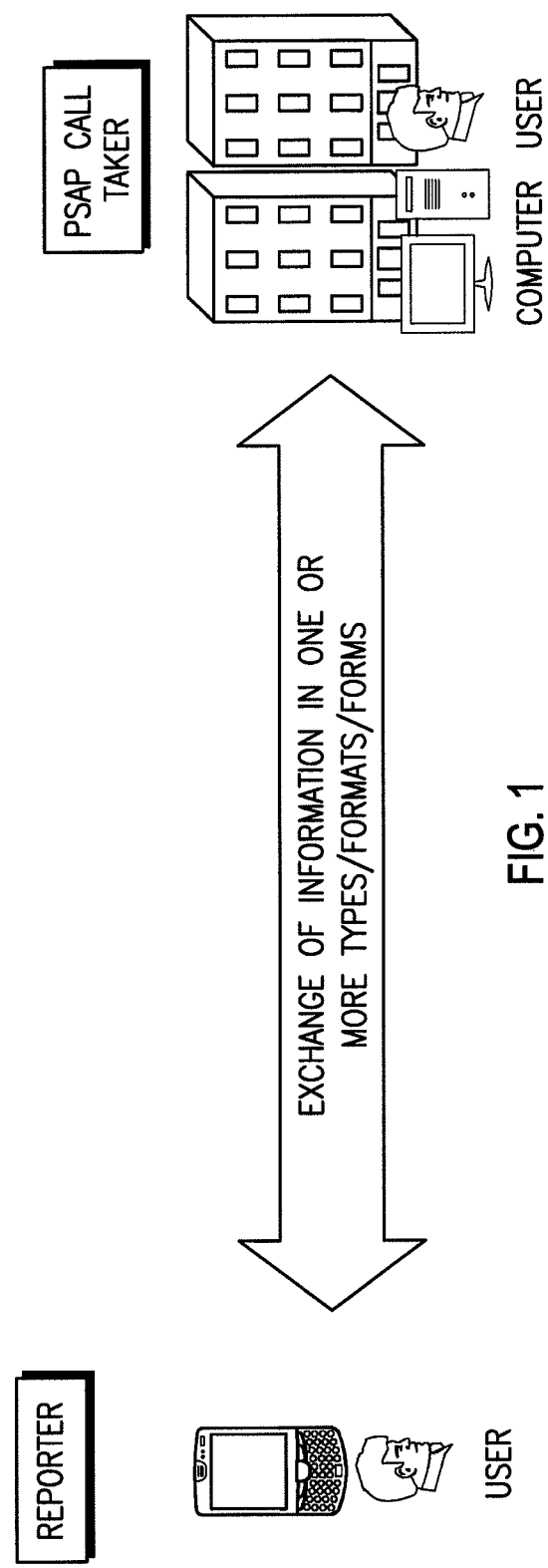
FIG. 1 is an example of a traffic model for NOVES.
Figure 2A:
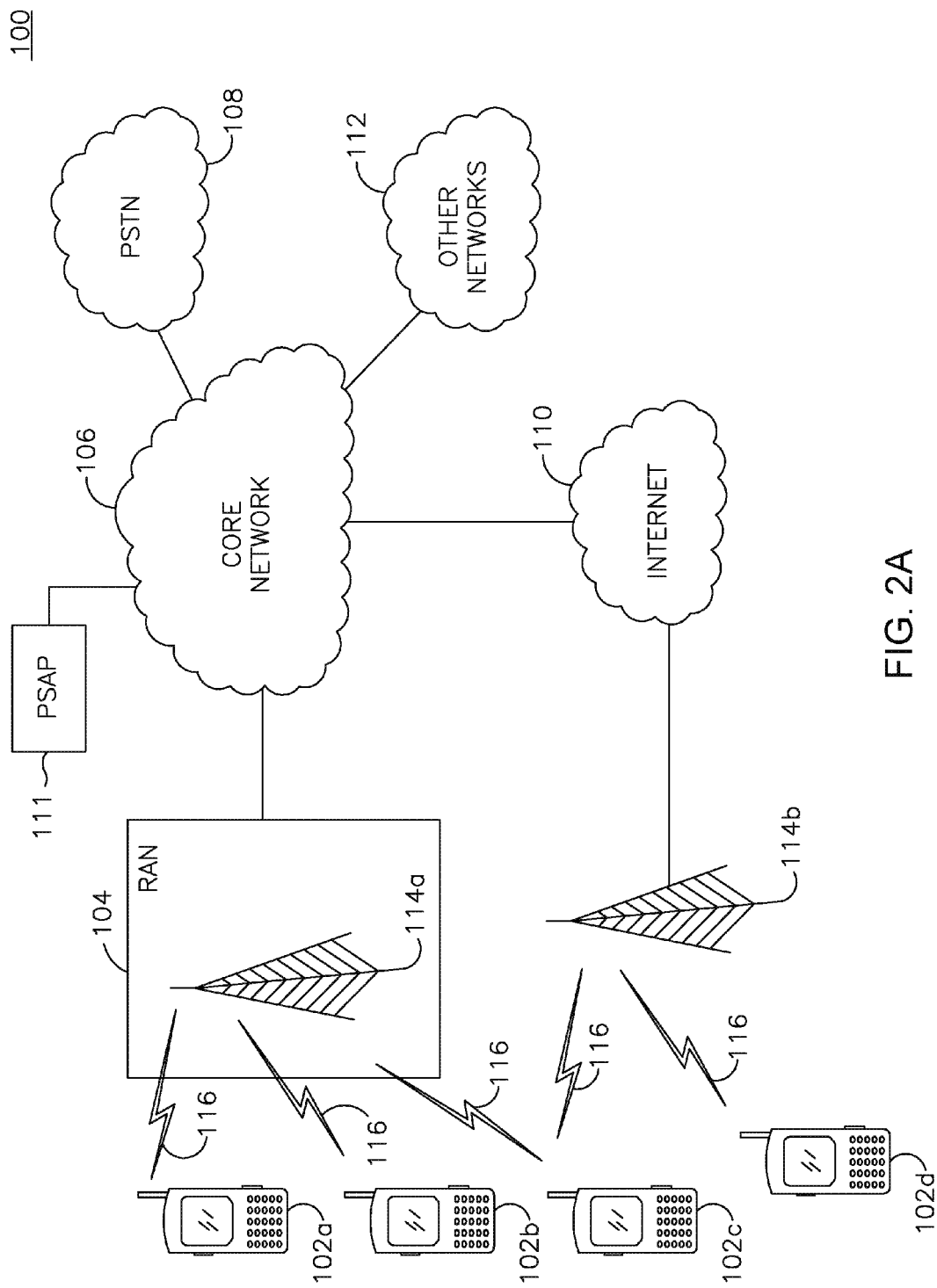
FIG. 2A is a system diagram of an example communications system in which one or more disclosed embodiments may be implemented.

FIG. 2A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 100 may include wireless transmit/receive units (WTRUs) 102a, 102b, 102c, 102d, a radio access network (RAN) 104, a core network 106, a public switched telephone network (PSTN) 108, the Internet 110, a Public Safety Answering Point (PSAP) 111, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 2A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 2A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 2A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 2A may be configured to communicate with the base station 114a, which may employ a cellular-based radio technology, and with the base station 114b, which may employ an IEEE 802 radio technology.

Figure 2B:
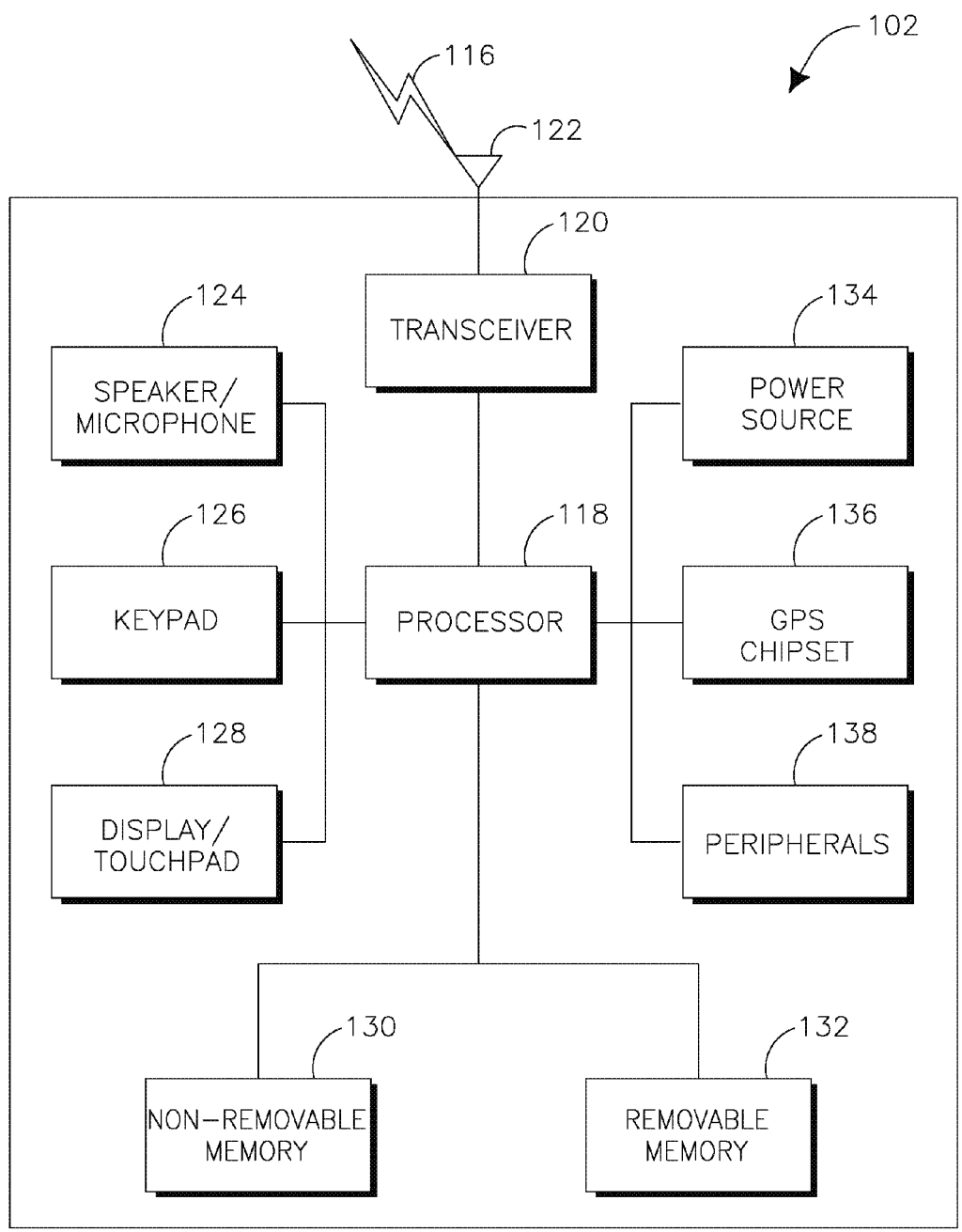
FIG. 2B is a system diagram of an example wireless transmit/receive unit (WTRU) that may be used within the communications system illustrated in FIG. 2A.

FIG. 2B is a system diagram of an example WTRU 102. As shown in FIG. 2B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 2B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2C:
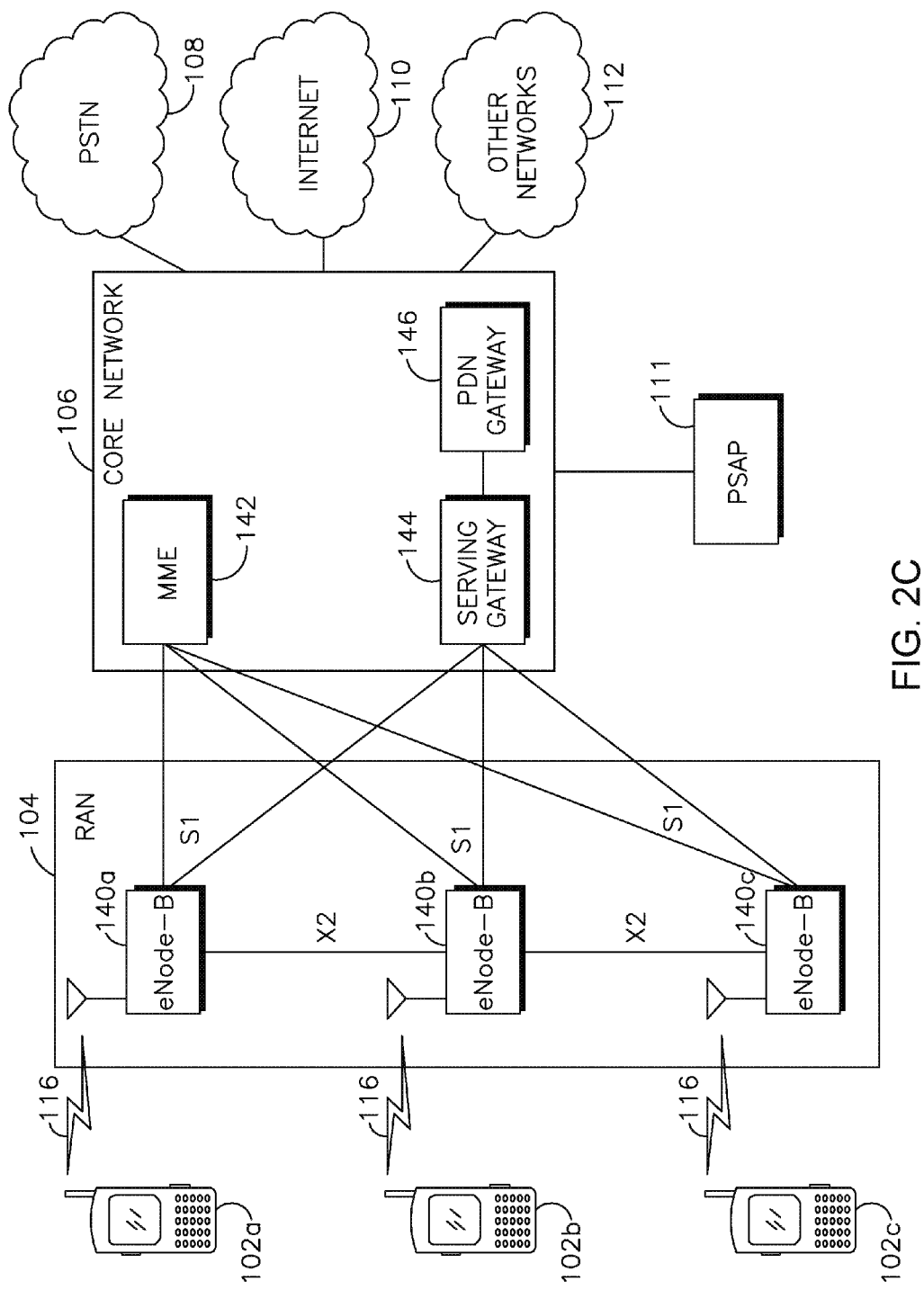
FIG. 2C is a system diagram of an example radio access network and an example core network that may be used within the communications system illustrated in FIG. 2A.

FIG. 2C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 2C, the eNode-Bs 140a, 140b, 140c may communicate with one another over an X2 interface.

The core network 106 shown in FIG. 2C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 3:
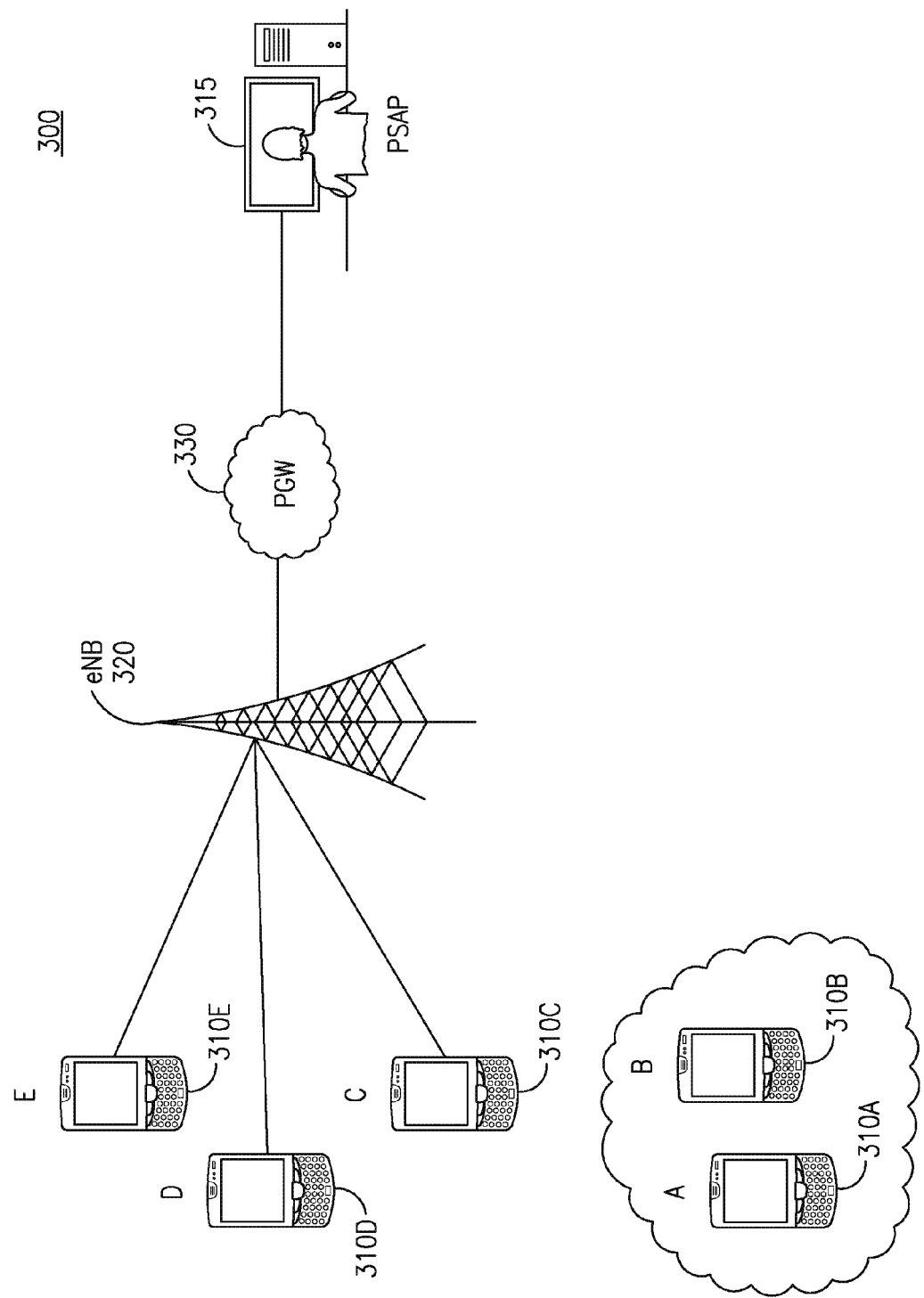
FIG. 3 is an example network configured to provide non-voice emergency services (NOVES)

FIG. 3 shows an example network 300 configured to provide non-voice emergency services (NOVES) sessions to WTRUs 310c, 310d. The network 300 includes a PSAP 315, an eNodeB 320, and a network PSAP interface node, (e.g. a PGW 330). Also shown in FIG. 3 are WTRUs 310a and 310b, which do not have a connection to the RAN 320.

Figure 4:
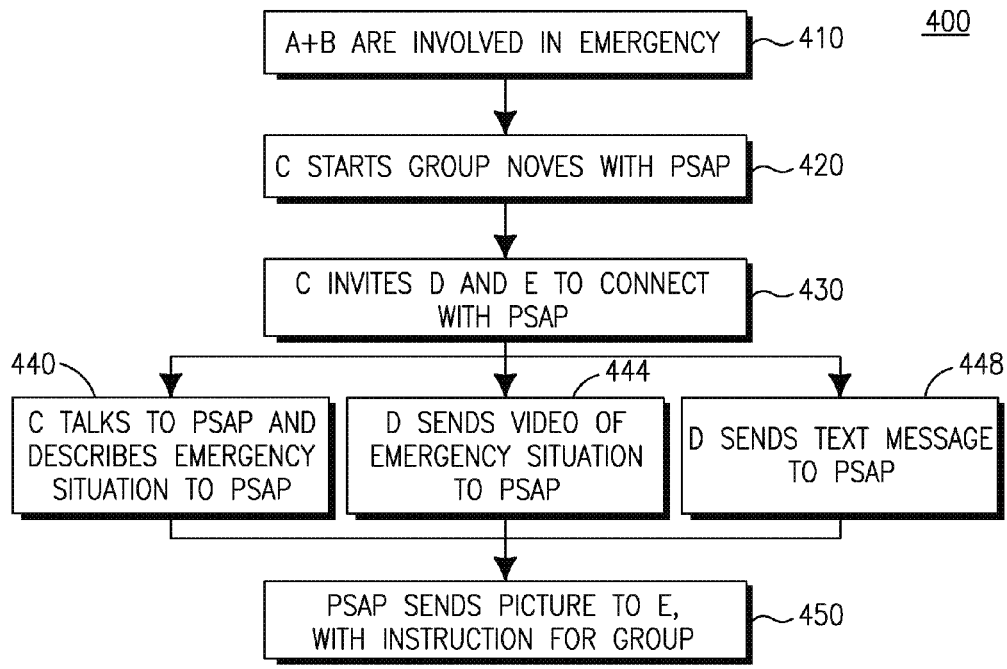
FIG. 4 is an example flow diagram of a procedure for the network of FIG. 3 to allow multiple reporters to joining a group NOVES session.

FIG. 4 shows an example flow diagram of a procedure 400 for the network 300 of FIG. 3 to allow multiple reporters to joining a group NOVES session. The procedure 400 begins when A 310a and B 310b are involved in an emergency situation, at 410. Next C 310c, having been made aware of A and B's 310a, 310b emergency situation, initiates a group NOVES session with a PSAP 315, at 420. Once the NOVES session is established C 310c may invite D 310d and E 310e to participate in the group NOVES session and connect to the PSAP, at 430. Alternatively, D 310d and E 310e may be invited to participate in the group NOVES session by the PSAP 315 (not pictured).

Once C 310C, D 310d, and E 310e are all participating in the NOVES session, each of the reporters may provide information to the PSAP 315. For example, C 310C may talk to the PSAP 315 and describe the emergency situation using voice, at 440. D 310d may send video of the emergency situation to the PSAP 315, at 444. E 310e may send text messages to the PSAP describing the emergency situation. While these are specific examples, it should be noted that once a reporter has joined a group NOVES session, they may provide the PSAP 315 with information using any media form available.

Once the group NOVES session has been established, the PSAP 315 may also provide the reporters with specific instructions. For example, the PSAP 315 may send a picture to E 310e with instructions for each of the other reporters 310c and 310d to follow, at 450.

It should be noted that in the example of FIG. 4, from the PSAP's point of view there only exists one NOVES session with multiple sub-sessions. The eNodeB 320 may route traffic for each session to the corresponding NOVES devices. It should also be noted that each reporter, or NOVES device, may be capable of joining more than one NOVES session at one time.

Figure 5:
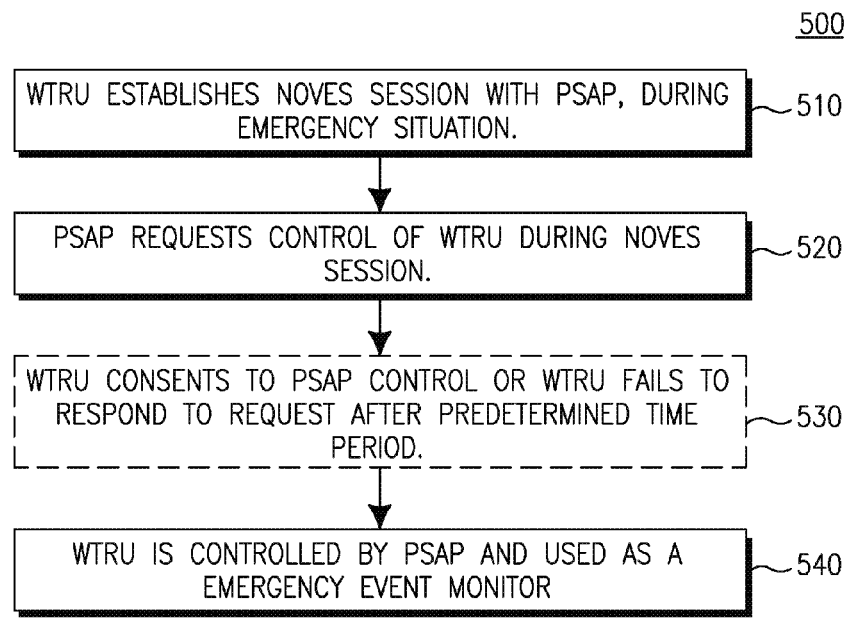
FIG. 5 is an example procedure for a PSAP to take control of a reporter WTRU during a PSAP call.

FIG. 5 shows an example procedure 500 for a PSAP to take control of a reporter WTRU during a PSAP call. This procedure may be useful when, for example, the reporter becomes unable to act to provide information due to a personal safety threat, or due to the loss of control or possession of the WTRU. The procedure begins when the reporter using a WTRU establishes a NOVES session with a PSAP during a emergency situation, at 510. During this emergency situation, the PSAP may request control of the WTRU, or a feature of the WTRU, during the NOVES session, at 520. Optionally, the reporter may consent to the PSAP's request to take control, or the WTRU may fail to respond to the request after a period of time, at 530. After the PSAP receives consent from the reporter, or the WTRU fails to respond for a period of time, the PSAP takes control of at least one feature of the WTRU and uses it as an emergency event monitor, at 540.

In one example, the procedure of FIG. 5 may be used to turn the WTRU into a fake turned-off state such that all the inputs to the device are temporarily blocked, and the audible sound capabilities of the WTRU may be turned-off. In this way, the WTRU will look like it is turned-off, or not functioning.

In this fake turned off state, the WTRU may become a trace device such that it may continuously send out location information, or respond to WTRU positioning/location commands. This will allow a PSAP call taker to guide search or recovery actions by the appropriate authorities for the emergency situation.

In another example, the fake turned-off WTRU may be used as an emergency event monitor. In this example, the PSAP may take control of the WTRU and engage one or more sensing capabilities on the WTRU to send back audio, video, or other forms of event information captured on the emergency scene to the PSAP call taker. For example, if a criminal, or bad actor, has taken possession of the WTRU while committing a crime, this capability will allow the PSAP to turn the WTRU into a trace device to monitor the emergency, with out letting the criminal know that the device is turned on and functioning.

In another example, the procedure of FIG. 5 could be used to enable the A-GPS function on the device to find out the exact location of the device. This could be used in the event of a kidnapping or robbery.

It should be noted that in the procedure of FIG. 5, the PSAP and WTRU may be preconfigured for the PSAP to take control of the WTRU in the event that a NOVES session is established. This would eliminate the need for the PSAP to request to take control as happens in 520. It may also be possible that the reporter can trigger some of the above described modes without the PSAP requesting them. This could be done by a pre-set trigger for example, or the reporter may send an indication to the PSAP for the triggering of one or more operation modes described above.

It should also be noted that a PSAP may need to obtain the capabilities and consent from the WTRU/reporter. This can be done when the NOVES session is initiated, 510, or in a subsequent message from the reporter device to the PSAP. It is also possible that the WTRU may be associated with a NOVES subscription or policy. The PSAP may learn of such a subscription when the NOVES session is initiated.

As is described above, at 530, the WTRU may not respond to the PSAP's original request to take control of the device. This could be because, for example, the reporter is in danger and can not be seen manipulating the WTRU. Accordingly, the WTRU may be configured such that if the WTRU does not respond to the PSAP's request for a period of time, the PSAP may proceed with taking control of the WTRU.

Figure 6:
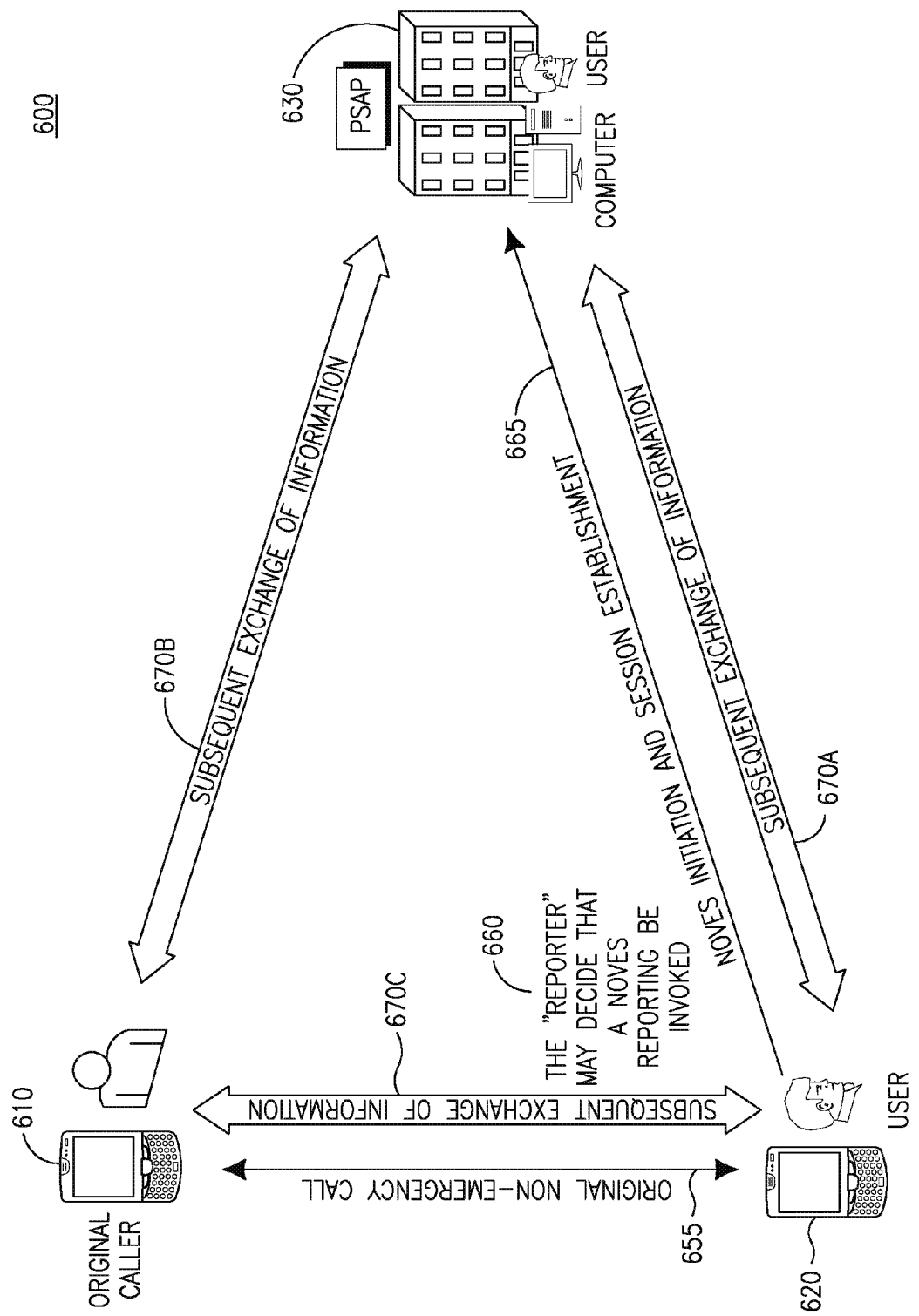
FIG. 6 shows an example communication system for initiating and relaying a NOVES session to a PSAP.

FIG. 6 shows an example communication system 600 for initiating and relaying a NOVES session to a PSAP. The system 600 includes a caller WTRU 610, a reporter WTRU 620, and PSAP 630. The caller WTRU 610 may be involved in an emergency situation, during a call with the reporter WTRU 620, at 650. The caller WTRU 610 may be operated by a human, or may be a monitoring device, such as a home monitoring camera or medical monitoring device. Based on observations made during the call, or on reports from the caller WTRU 610, the reporter WTRU 620 may decide to initiate a NOVES session for the caller WTRU 610, at 655. The reporter WTRU 620 may perform a NOVES initiation and establishment procedure with the PSAP 630, at 660.

Once the NOVES session has been established between the reporter WTRU 620 and the PSAP 630, several different options may be possible. For example, the reporter WTRU 620 may forward the previously received information from the caller WTRU 610 and/or the ongoing call information to the PSAP 630 as an initial report, 670a. The WTRU 620 may also inform the PSAP 630 that the caller WTRU 610 is still online and provide information sufficient for the PSAP 630 to connect directly to the WTRU 610, 670b. The PSAP 630 may also decide to conference in the caller WTRU 610 in an acceptable format for exchanging emergency information between the caller WTRU 610 and the PSAP 630. The reporter WTRU 620 may also provide multi-way communication or a conference call to serve as a relay between the PSAP 630, and the caller WTRU 610, 670c.

After the caller WTRU 610 has joined the NOVES session by one of the above methods, the PSAP call taker may have direct communication with the caller WTRU 610, or may perform device manipulation, or remote monitoring using the caller WTRU 610. In some cases, the PSAP 630, or the reporter WTRU 620, may need to use an authorization code or other form of consent agreement in order to take control of the caller WTRU 610.

The reporter WTRU 620 may be configured to provide information relating to other NOVES capabilities for the caller WTRU 610, such as real time text (RTT) to the PSAP 630. The PSAP 630 may request control of these additional NOVES capabilities during the NOVES session. At some point during the NOVES session the reporter WTRU 620 may drop off of the session, while the caller WTRU 610 and the PSAP 620 continue the established NOVES session.

Figure 7:
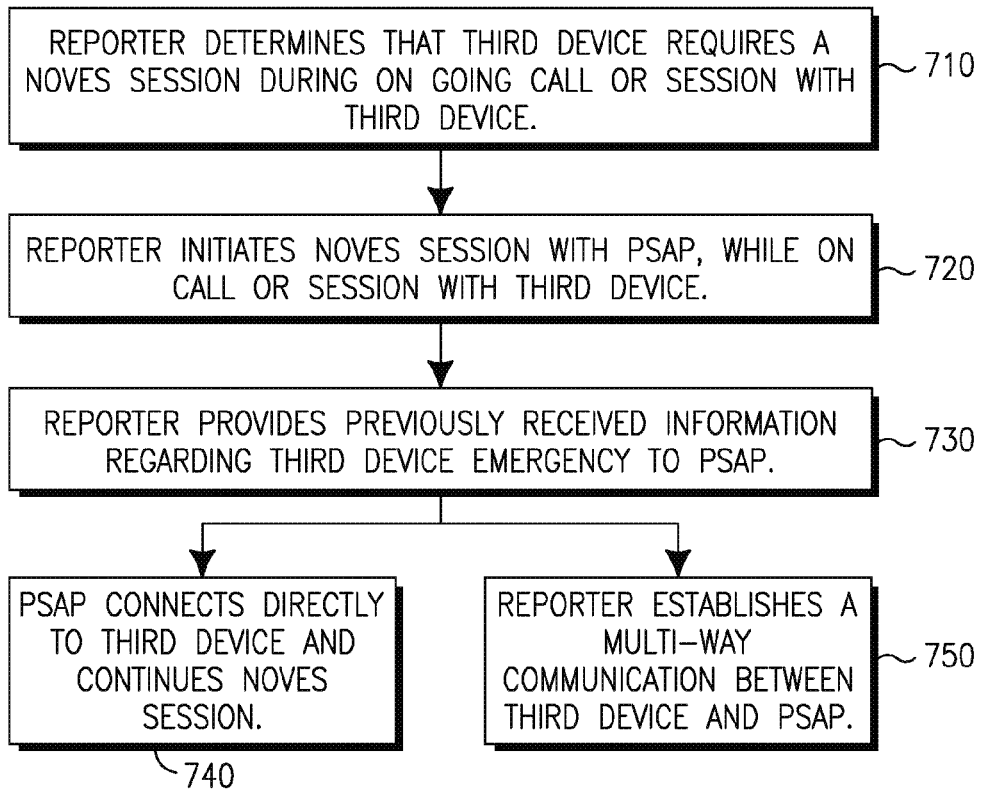
FIG. 7 is another example procedure for establishing a relayed NOVES session.

FIG. 7 is another example procedure 700 for establishing a relayed NOVES session. The procedure begins when a reporter device determines that a third device requires a NOVES session, during an ongoing call with the third device, at 710. The reporter may initiate a NOVES session with a PSAP, while remaining on the call or session with the third device, at 720. Once the NOVES session is established the reporter may provide previously received information regarding the third device's emergency situation to the PSAP, at 730. At this point, the PSAP may connect directly to the third device and continue the NOVES session directly with the third device, at 740. Alternatively, the reporter may establish a multi-way communication between the third device and the PSAP, at 750.

The concepts of FIGS. 6 and 7 may also be applicable to machine type communication (MTC) devices. For example when an MTC handler (a human or MTC-server) determines that an MTC device originated communication requires emergency handling, the MTC handler may take a role as a NOVES reporter and initiate a NOVES session to the PSAP. The NOVES reporter in the initiation signal may indicate the existence of the original MTC device. When the NOVES session is set, either the PSAP or the MTC handler/NOVES reporter may set a multiparty communication in either a predetermined or dynamically configured media format in a subsequent emergency reporting and evaluation phase.

Figure 8:
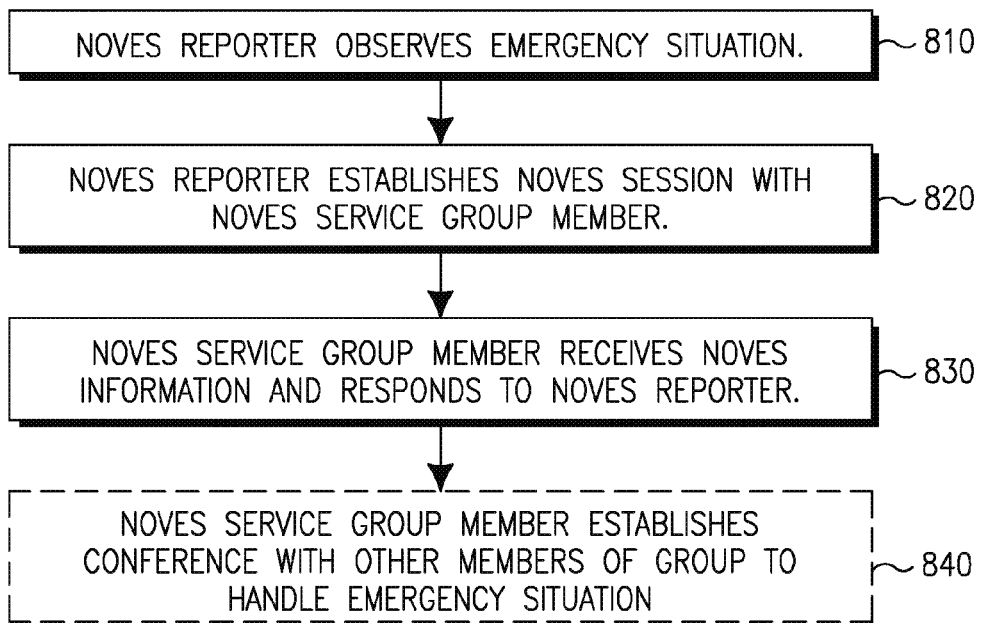
FIG. 8 is an example flow diagram of a procedure for a mobile terminated NOVES group session.

FIG. 8 shows an example flow diagram of a procedure 800 for a mobile terminated NOVES group session. The procedure 800 begins when a NOVES reporter observes an emergency situation, at 810. The NOVES reporter may belong to a special NOVES group, or NOVES service/business group, that may jointly possess a special NOVES number for a specific cause of service, business, or special emergency information sharing. For example, in handling an emergency related to a special medical situation, such as special disease symptom a special expert group may be needed to handle situations that a normal PSAP would not be able to handle. Upon observing an emergency situation the NOVES reporter establishes a NOVES session with a NOVES service group member, at 820. In order to initiate this service, the NOVES reporter may call a NOVES number to reach directly at least one of the NOVES group members or NOVES devices in a defined group with different NOVES information type/form. The NOVES service group member receives NOVES information from the NOVES reporter, and responds to the reporter, at 830. Depending on the type of emergency and the NOVES group responding, the NOVES service group member may conference in other members of the NOVES service group to handle the emergency situation.

In a variation of the procedure 800 of FIG. 8, the NOVES reporter may initiate the NOVES session with a PSAP. The PSAP call taker then may determine that a specific NOVES service group may be needed. For example the PSAP call taker may determine that special technical, medical, or other expert advice may be needed. The PSAP can then connect the ongoing NOVES session with whatever specific NOVES service group is required, including sending the NOVES session to mobile devices of members of the NOVES service group. This would allow the new mobile device of the member of the NOVES service group to share additional information relating to the emergency situation. The mobile device of the member of the NOVES service group may then communicate with the reporter using one or more NOVES information types, formats, or forms. The new user of the new mobile device of the NOVES service group may also take control of the reporter's device if proper authorization is obtained from the PSAP and the reporter has consented to such control.

It should be noted that, the procedures described with respect to FIG. 8 also enable NOVES service group members and devices to receive other emergency information from one or more of the defined sources. For example NOVES service group members may receive information from a public warning system on earth quake, tsunamis, fires, floods, war, and other emergency/disaster situations.

Figure 9:
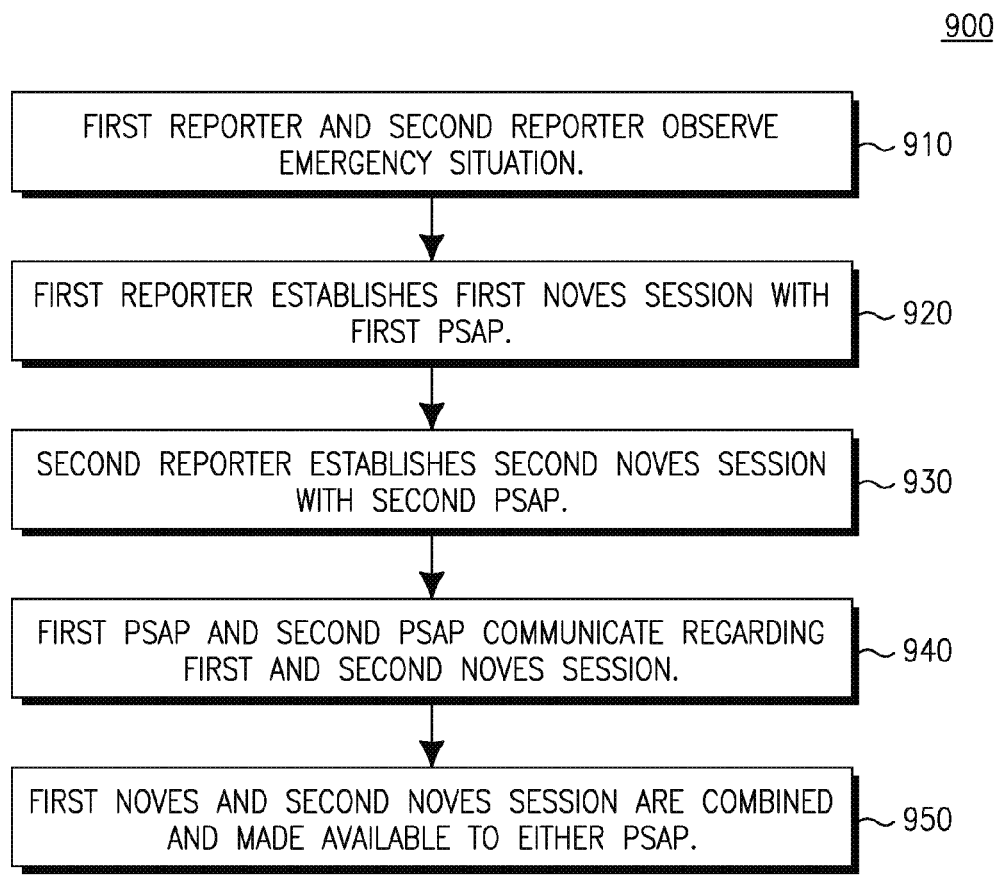
FIG. 9 is an example flow diagram for a procedure for a PSAP to join several reporter sessions at one time.

FIG. 9 shows an example flow diagram for a procedure 900 for a PSAP to join several reporter sessions at one time. In many cases, an emergency situation may require more than one reporter to facilitate handling of the emergency. For example a single explosion could cause both fire and human casualties, thereby requiring different PSAPs. The procedure 900 begins when a first reporter and a second reporter observe an emergency situation, at 910. The first reporter establishes a NOVES session with a first PSAP, at 920. The second reporter establishes a second NOVES session with a second PSAP, at 930. The first PSAP and the second PSAP then communicate regarding the first and second NOVES sessions, at 940. The first and second NOVES sessions are then combined and made available to either PSAP, at 950.

The procedure 900 may be used for authorities to associate piece-wise information into a larger picture to quickly comprehend the overall situation. It may also be used to deploy monitoring devices and trace forces by taking control of various different devices in the joint NOVES session. PSAPs may coordinate with each other using a peer-to-peer model where one PSAP solicits the other to see what it is monitoring.

The PSAPs may, alternatively, be coordinated by a temporary group leader. A temporary group leader will need to have security authority over the other PSAPs. The inter PSAP communication may be used if a first PSAP determines that a NOVES session should be rerouted to a different PSAP, or if a different PSAP should be conferenced in on the first PSAP's NOVES session. For example a first PSAP may determine that a PSAP that is familiar with hazardous materials is needed. The first PSAP may also determine that a second PSAP is only needed for a specific NOVES sub-session, and accordingly only transfer one NOVES sub-session to the second PSAP.

The NOVES session in FIG. 9 may be further expanded by one PSAP inviting other reporters or users in the same location to join the NOVES session. The other reporters or users may then use a variety of media types to report the extent of the emergency situation using audio, voice, video, or other forms of emergency information.

Figure 10:
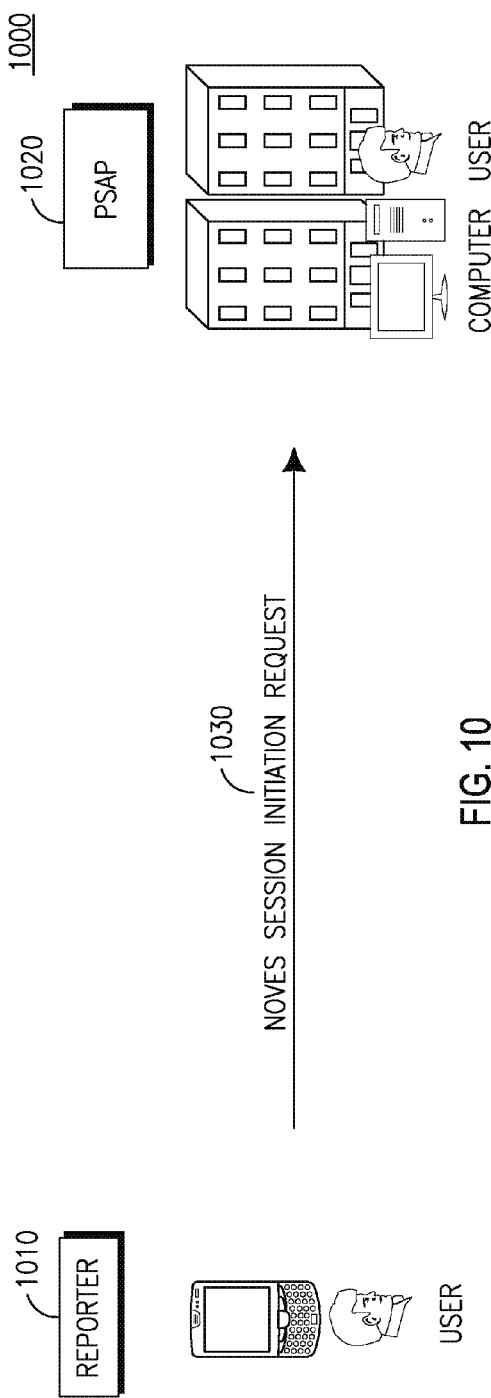
FIG. 10 shows an example signal flow diagram for sending a NOVES session initiation request between a reporter and PSAP.

FIG. 10 shows an example signal flow diagram for sending a NOVES session initiation request between a reporter 1010 and a PSAP 1020. The reporter 1010, upon observing an emergency situation, determines that it should initiate a NOVES session, and send a NOVES Session Initiation Request message 1030 to the PSAP 1020.

Figure 11:
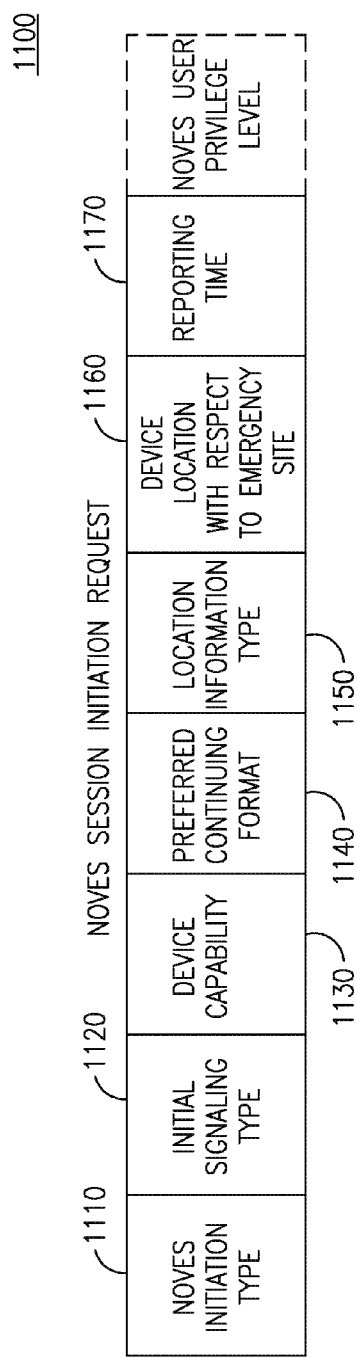
FIG. 11 is an example format for a NOVES Session Initiation Request message.

FIG. 11 shows an example format for a NOVES Session Initiation Request message. The message may include the following fields: NOVES Initiation Type field 1110; Initial Signaling Type field 1120; Device Capability field 1130; Preferred Continuing Format field 1140; Location Information Type field 1150; Device Location with respect to Emergency Site field 1160; and Reporting Time field 1170. Optionally, a NOVES User Privilege Level field 1180 may be added. Other fields may be added to the message as is required, and some fields may also be removed from the message.

The NOVES Initiation Type field 1110 may be provided so that the PSAP may acquire information needed to prepare for subsequent actions. Examples of possible entries for the NOVES Initiation Type field 1110 include: direct-initiation; relayed-initiation (meaning a communication between a reporter and another party exists before the request message, for example); joining-a-session; or an initiation-from a PSAP. Other NOVES Initiation Type field 1110 are also possible.

The Initiation Signaling Type field 1120 may be provided so that the PSAP knows how to treat the initiation request message and how to proceed with the session. Examples of possible entries for the Initiation Signaling Type field 1120 include: voice; regular-message, canned-message, canned message with location, video clip, or empty-message. Other Initiation Signaling Type field 1120 values are possible.

The Device Capability field 1130 may be provided so that the PSAP may learn how to manipulate the subsequent communication formats. Examples of possible entries for the Device Capability field 1130 include: messaging; voice-input; voice output; video input; video output; RTT input; RTT output; beacon signal output; GPS, other-location-capability; silent-controllable; input-block-able (for example to block part or all external inputs to the device under the PSAP command); and fake power-off (to pretend to be powered off and not able to repower under PSAP command). Other Device Capability field 1130 values are possible.

The Preferred Continuing Format field 1140 may be provided so that the reporter may indicate how to continue the communication with the PSAP. Examples of possible values for the Preferred Continuing Format may include: RTT; message; voice; video; sign language; silent mode; and PSAP control. Other values for the Preferred Continuing Format field 1140 values are possible.

The Location Information Type field 1150 may be provided so that the PSAP knows how to interpret and use the location information provided by the reporter. Examples of possible values for the Location Information Type 1150 field include: GPS; 3GPP location methods such as OTDOA; or none available. Other Location Information Type values are possible.

The Device Location with Respect to Emergency Site field 1160 may be provided so that the PSAP knows how to use the location information, or how to pursue more location information from the device. The value of the Device Location with Respect to Emergency Site field 1160 may include for example: static prepared address site (such as in a canned message); static on site (the location indicates the emergency site which is static); mobile with the site (the emergency site is mobile and the device is mobile with it); and mobile off site (the emergency site is static, the device is moving away from it). Other Device Location with Respect to Emergency Site field 1160 values are possible.

The Reporting Time with respect to Ongoing Emergency field 1170 may be provided so that the PSAP knows how to handle the emergency in terms of priority. Examples of possible values for the Reporting time with respect to Ongoing Emergency field 1170 include: in the past; just started; ongoing, and the like. Other Reporting Time with respect to Ongoing Emergency field 1170 values are possible.

The fields describe above with respect to the NOVES SESSION INIATION REQUEST message may be provided in some other message such as in a reporter's runtime input, or some other preconfigured, or prepared information, such as a canned message.

Referring back to FIG. 10, when the PSAP 120 receives the NOVES session Initiation Request message 1030, the PSAP 120 may act using the information described in FIG. 11. Additionally, if the initiation request does not include the device location information, or if the device is mobile with the emergency site, or the accuracy of the position needs further verification, the PSAP 120 may perform a positioning procedure to locate the reporting device.

Based on the information provided in the NOVES Session Initiation Request 1030 message, the PSAP 120 may choose an appropriate format for subsequent communication with the reporting device/reporter 1010. The PSAP 120 may do this, for example according to the reporter/device indicated format, to a preconfigured scenario, or by the choice of the PSAP call taker.

Based on the information provided in the NOVES Session Initiation Request message 1030, the PSAP 120 may also perform remote control of the device as a reporting/monitoring device for listening (audio), watching (video), tracing (via beacon output signal) while possibly putting the device in silent and/or no-input mode and/or the fake power-off state.

Based on the information provided in the NOVES Session Initiation Request 1030 message, the PSAP 120 may also perform conferencing capability for the NOVES session for facilitating the multi-party communication by joining multiple reporters and/or multiple PSAPS together in order to handle the emergency situation.

When a NOVES session is requested, the device/user NOVES User Privilege Level field 1180 may be included in the NOVES Session Initiation Request message 1100. Subsequent handling and routing priority may depend on this NOVES user privilege level value.

Typically a NOVES device has at least a voice capability or texting capability. All NOVES devices could initiate a NOVES session when an appropriate PSAP number/ID/address is requested by the user/device. These are the ordinary NOVES users and they may only perform the one-reporter-one-PSAP type of emergency service work. These devices may have the lowest NOVES user privilege level.

Special NOVES user/service members may also exist who can perform some special activity described and/or that may need special registration to the PSAP services. These devices or members may have higher NOVES user privilege levels.

Figure 12:
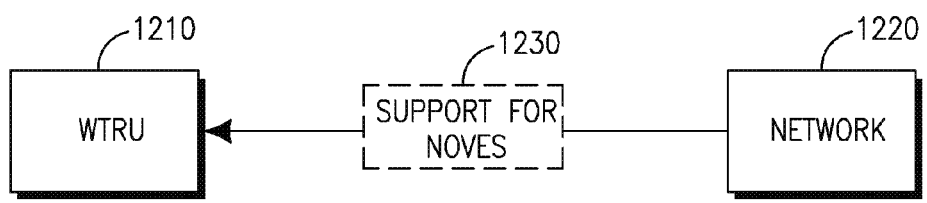
FIG. 12 is an example signaling diagram of a procedure for a network to notify a WTRU of the network's support for NOVES.

FIG. 12 is an example signaling diagram of a procedure 1200 for a network 1220 to notify the WTRU 1210 of the network's support for NOVES. The network 1220 sends a Support for NOVES message 1230 to the WTRU 1210.

The network 1220 needs to inform the WTRU 1210 about whether NOVES is supported, and if NOVES is supported what features or what different kinds of media streams that are supported by the network 1220. This is because different PSAPs or different networks may only choose to use specific media streams for a NOVES call.

In another embodiment, the network may inform the WTRU about the support of NOVES in the EPS network feature support information element. In a WTRU with NOVES capability, the NOVES support indicator may be provided to the upper layers. The upper layers may then take this indication in consideration when selecting the type of emergency call to place or when trying to initiate a NOVES session. This information element, or a new information element, may also provide the indication to the type of NOVES media supported by the network e.g. RTT, video emergency call and the like. The WTRU may then indicate to the user about the available NOVES services so that the user selects the appropriate media while making an emergency call. These indications may be provided in the Attach accept message, Tracking Area Update message or any other NAS downlink message to the WTRU for example. The NOVES media session support may change as the WTRU moves into different regions (e.g. different Tracking Area or an area covered by a different PSAP). In this scenario an updated NOVES support indication may be sent to the WTRU by the network. These indications may be sent as soon as the network detects a WTRU's NOVES information is inconsistent with the NOVES support capabilities of the network. This indication from the network may not be sent to all the attached WTRUs. In one example, the NOVES support capabilities may only be sent if a WTRU indicates that it is NOVES capable A NOVES indication may also be provided by an IMS network. The WTRU may include its NOVES capabilities in the registration message to the IMS network. These capabilities may include support for NOVES and the type of media streams supported by the WTRU. The IMS network may then indicate in the Registration OK message whether or not NOVES is supported by the IMS network and if it is supported then it may also include the type of media streams supported by the network. When S-CSCF receives the registration message from the WTRU, it may query the HSS to confirm that the WTRU has subscribed to NOVES or that the WTRU is authorized to establish a NOVES call.

The support for NOVES (including support via IMS network) may also be broadcasted by the network using RRC signaling for example in system information blocks (SIBs). This may enable a WTRU which is not yet registered to the network to make a NOVES call directly. Also WTRUs without a USIM may use this information to establish a NOVES session. The SIBs may include the type of media available, and may also restrict non-attached WTRUs to use a certain kind of media for the emergency call.

Figure 13:
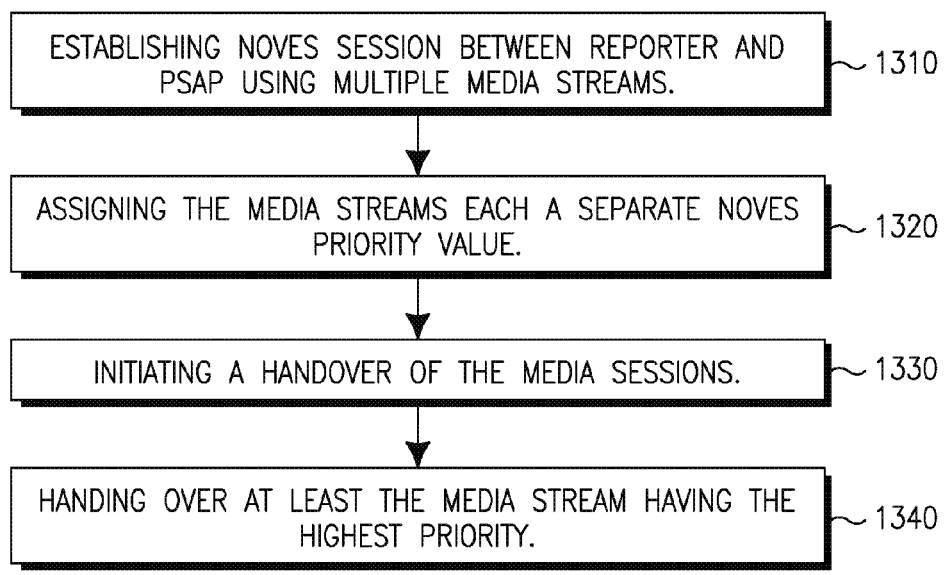
FIG. 13 is a flow diagram of an example procedure for establishing and handing over a NOVES session that uses multiple media streams.

The network may also use Open Mobile Alliance Device Management (OMA DM) procedures or push the information from the access network discovery selection function (ANDSF) to the WTRU to indicate the support of NOVES services. In this situation, the network could configure the WTRUs with these capability in order to show it supports NOVES FIG. 13 is a flow diagram of an example procedure 1300 for establishing and handing over a NOVES session that uses multiple media streams. First, the reporter establishes a NOVES session with a PSAP using multiple media streams, at 1310. One or more media streams, each in a different format, may be initially configured and added or removed later for a particular NOVES session from a WTRU to a PSAP.

Each of the media streams is assigned a separate NOVES priority value, at 1320. A handover is initiated for all of the media streams, at 1330. The handover is carried out for at least the media stream having the highest priority value, at 1340. If conditions permit, some or all of the remaining media streams may also be handed over.

It should be noted that, each media stream may be transported from the WTRU to the network on a different bearer. This allows for a handover where all bearers may not be successfully handed over to the target RAN node. This also may ensure that the NOVES session continues after the handover case even though some of the media streams may be dropped by the target system. When a new media stream is added by the PSAP or the WTRU, a new dedicated bearer may be established for this media stream. The dedicated bearer may be tagged as an emergency bearer so that it receives preferential treatment by the network.

Each media stream may be assigned an emergency priority value, as in 1320. This priority value indicates the importance of that particular media stream during the NOVES session. This priority will indicate what streams can be deactivated or dropped by the network and what streams can absolutely not be deactivated. The highest priority media stream or bearers carrying the highest priority media stream may never be deactivated by the network or dropped by the target RAN node during the handover. If the bearer carrying the highest priority media stream is deactivated it may as a result deactivate the ongoing NOVES session. During the handover, the target node may choose to drop the bearer with a lower priority media stream, however the target node will always accept the bearer carrying, a high, or the highest priority media stream.

Additionally, during the handover the source may indicate to the target in the handover request message that there is an ongoing NOVES session. The target will use this information to check that NOVES is supported at the target node and will try to efficiently execute the handover procedure.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), the WTRU comprising:
   a transmitter configured to transmit first message, wherein the first message includes indication of whether the WTRU supports a fake power-off mode; and
   a receiver configured to receive a second message that includes an instruction for the WTRU to enter into the fake power-off mode.

2. The WTRU of claim 1, wherein the first message includes a location type field that indicates which types of location information are available to the WTRU.

3. The WTRU of claim 1, wherein the first message includes a device location with respect to emergency site field that indicates a location of the WTRU with respect to an emergency site.

4. The WTRU of claim 1, wherein first message includes a preferred continuing format field that indicates a communications format that is preferred by the WTRU for continuing a communication session.

5. A wireless transmit/receive unit (WTRU), the WTRU comprising:
   a transmitter configured to transmit first message, wherein the first message includes indication of whether the WTRU supports a fake power-off mode; and
   a processor configured to cause the WTRU to enter a fake power-off mode, wherein entering the fake power-off mode disables any inputs, sounds or displays on the WTRU.

6. The WTRU of claim 5, wherein the first message includes a location type field that indicates which types of location information are available to the WTRU.

7. The WTRU of claim 5, wherein the first message includes a device location with respect to emergency site field that indicates a location of the WTRU with respect to an emergency site.

8. The WTRU of claim 5, wherein first message includes a preferred continuing format field that indicates a communications format that is preferred by the WTRU for continuing a communication session.

9. A wireless transmit/receive unit (WTRU), the WTRU comprising:
   a transmitter configured to transmit first message, wherein the first message includes an indication of whether the WTRU supports a fake power-off mode; and
   a processor configured to cause the WTRU to enter the fake power-off mode, wherein entering the fake power-off mode prevents the WTRU from being powered on without external control.

10. The WTRU of claim 9, wherein the first message includes a location type field that indicates which types of location information are available to the WTRU.

11. The WTRU of claim 9, wherein the first message includes a device location with respect to emergency site field that indicates a location of the WTRU with respect to an emergency site.

12. The WTRU of claim 9, wherein first message includes a preferred continuing format field that indicates a communications format that is preferred by the WTRU for continuing a communication session.

13. A wireless transmit/receive unit (WTRU), the WTRU comprising:
    a transmitter configured to transmit a first message, wherein the first message includes indication of whether the WTRU supports a fake power-off mode; and
    a processor configured to cause the WTRU to enter the fake power-off mode, wherein operating in the fake power-off mode includes transmitting trace signals for tracking the WTRU.

14. The WTRU of claim 13, wherein the first message includes a location type field that indicates which types of location information are available to the WTRU.

15. The WTRU of claim 13, wherein the first message includes a device location with respect to emergency site field that indicates a location of the WTRU with respect to an emergency site.

16. The WTRU of claim 13, wherein first message includes a preferred continuing format field that indicates a communications format that is preferred by the WTRU for continuing a communication session.

17. A wireless transmit/receive unit (WTRU), the WTRU comprising:
    a transmitter configured to transmit a first message, wherein the first message includes indication of whether the WTRU supports a fake power-off mode; and a processor configured to cause the WTRU to enter the fake power-off mode, wherein operating in the fake power-off mode includes monitoring.

18. The WTRU of claim 17, wherein the first message includes a location type field that indicates which types of location information are available to the WTRU.

19. The WTRU of claim 17, wherein the first message includes a device location with respect to emergency site field that indicates a location of the WTRU with respect to an emergency site.

20. The WTRU of claim 17, wherein first message includes a preferred continuing format field that indicates a communications format that is preferred by the WTRU for continuing a communication session.

* * * * *